F. McINTYRE.
REGULATOR FOR WATCHES.
APPLICATION FILED MAR. 29, 1909.

1,114,500.

Patented Oct. 20, 1914.
2 SHEETS—SHEET 1.

WITNESSES:
Frank L. Shidler.
William A. Frederick

Fred McIntyre
INVENTOR

F. McINTYRE.
REGULATOR FOR WATCHES.
APPLICATION FILED MAR. 29, 1909.

1,114,500.

Patented Oct. 20, 1914.
2 SHEETS—SHEET 2.

WITNESSES:

INVENTOR

UNITED STATES PATENT OFFICE.

FREDERICK McINTYRE, OF KANKAKEE, ILLINOIS, ASSIGNOR, BY MESNE ASSIGNMENTS, TO EDWARD R. HILLS, OF CHICAGO, ILLINOIS.

REGULATOR FOR WATCHES.

1,114,500.  Specification of Letters Patent.  Patented Oct. 20, 1914.

Application filed March 29, 1909. Serial No. 486,451.

*To all whom it may concern:*

Be it known that I, FREDERICK McINTYRE, a citizen of the United States, residing at Kankakee, in the county of Kankakee and State of Illinois, have invented certain new and useful Improvements in Regulators for Watches, of which the following is a specification.

This invention relates to the art of watch regulators, and has for its general object to effect certain improvements in such devices, more particularly in the directions of lessening the liability of breakage or disarrangement of the balance or hair-spring while in the act of moving the regulator, eliminating back-lash or lost motion, securing greater accuracy of adjustment, and improving the appearance and facilitating the manufacture of watch movements.

The improvements contemplated by my invention relate to that type of watch regulator employing a regulator arm associated with the usual balance cock and carrying curb pins engaging the balance spring, with means for angularly adjusting said regulator arm from the free end thereof. Heretofore such regulator arm and its adjusting means have commonly been mounted on the upper side of the balance cock. This has necessitated comparatively long curb pins to engage the balance spring, and it has also increased the liability of the regulator arm and its adjusting means to accidental misadjustment and even injury on account of the exposed position of these parts above the balance cock.

One feature of my improvements resides in locating these parts wholly below the upper surface of the balance cock, by which they are in a more protected location, and by which also much shorter curb pins can be employed which are less liable to bending than the longer curb pins heretofore used, thereby preserving the isochronal adjustment.

Other features of my improvements reside in a novel adjusting means for the regulator arm designed to prevent accidental slip or lost motion and to secure great fineness and accuracy of adjustment.

The invention, its mode of operation and the benefits and advantages secured thereby will be more fully apparent when considered in connection with the accompanying drawings showing certain practical forms in which the invention may be embodied, and in which—

Figure 1:
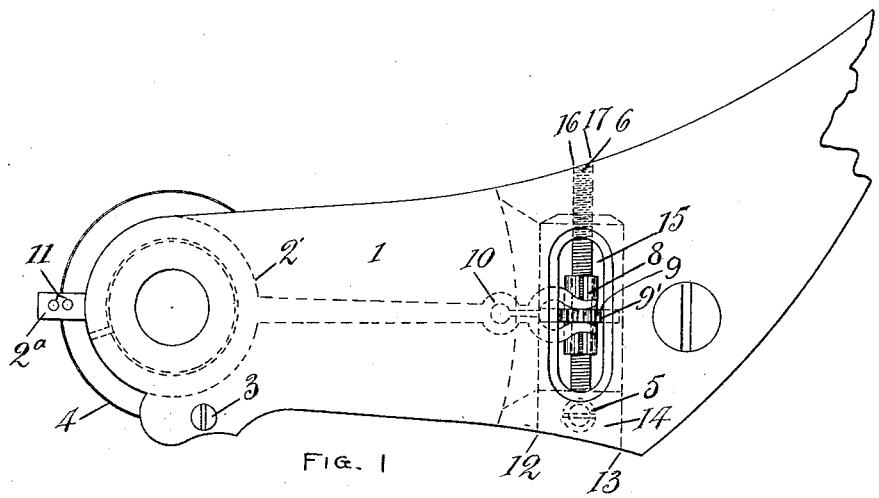
Figure 2:
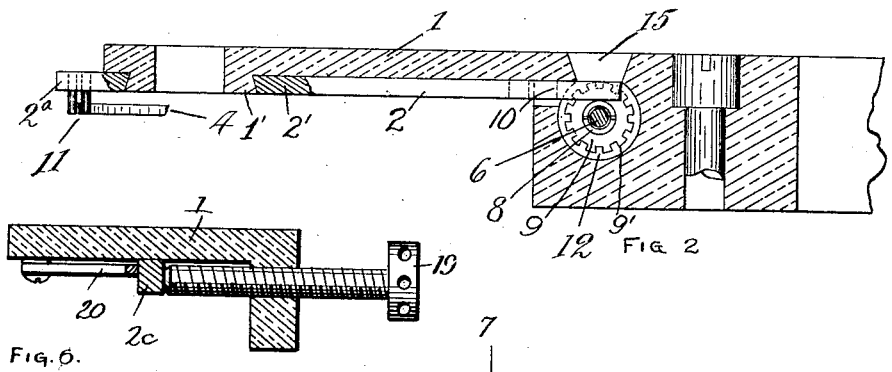
Figure 6:
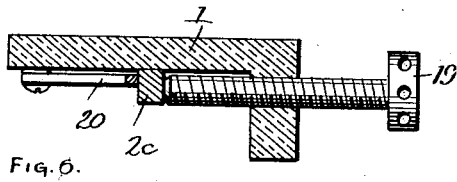
Figure 7:
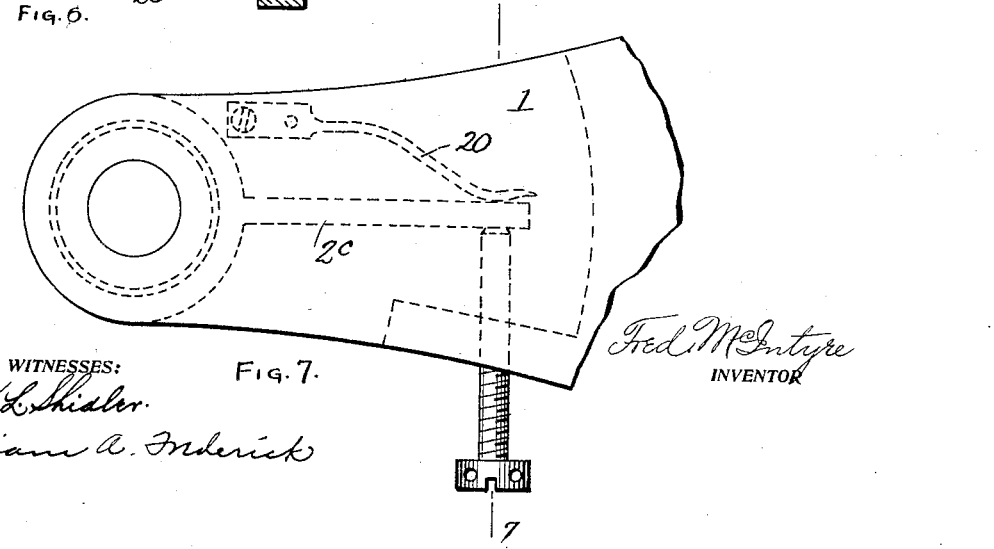
Figure 3:
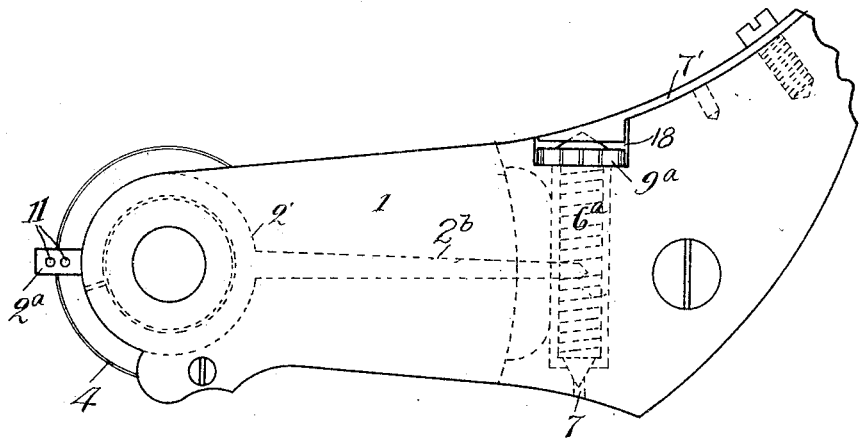
Figure 4:
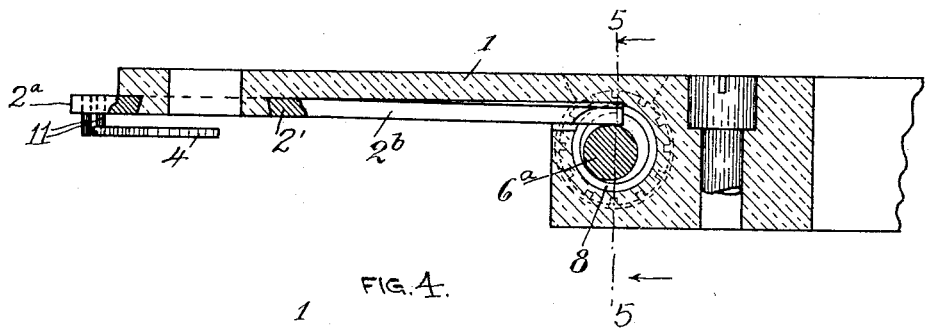
Figure 5:
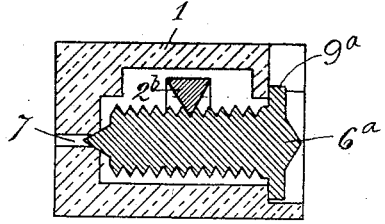

Figure 1 is a top view of the preferred form of my regulating mechanism. Fig. 2 is a substantially central longitudinal vertical section through Fig. 1. Figs. 3 and 4 are views similar to Figs. 1 and 2, respectively, showing a modification. Fig. 5 is a cross sectional view on the line 5—5 of Fig. 4. Fig. 6 is a view similar to Figs. 1 and 3 showing a further modification. Fig. 7 is a cross sectional view on the lines 7—7 of Fig. 6.

Referring first to Figs. 1 and 2, 1 designates the balance cock provided with the usual depending bearing boss 1' on which is mounted the usual spring collar 2' of the regulator arm 2, the free end of which latter terminates in a spring fork 10. The collar 2' has a short radial projection 2ª in which are secured the relatively short curb pins 11 that engage the balance spring 4 in the usual manner, the free end of said spring being secured in a stud 3 mounted in the balance cock 1.

The thicker base portion of the balance cock is formed with a chamber for the most part of the width indicated by the numerals 12 and 13, the opposite end of said chamber, however, being contracted and of a width indicated by the numerals 16, 17. In this chamber is mounted a micrometer screw 6, having at one end a head 14 which fits the open end of the enlarged portion of the chamber, while its opposite end slidably engages the contracted portion of said chamber. This screw is held against rotation by a small set screw 5. On the screw 6 is mounted a longitudinally split spring nut 8 which hugs the screw with gentle friction and is provided with an intermediate radially enlarged portion 9 that is embraced by the spring fork end 10 of the regulator arm 2, the fingers or prongs of said fork resting on the upper side of the nut 8 and maintaining light spring pressure against the sides of the radially enlarged portion 9, which latter is peripherally milled or toothed as indicated at 9' to facilitate the turning of said nut by a small screw driver or other small instrument through a slot 15 formed in the upper surface of the balance cock above and communicating with the underlying chamber in which the screw is mounted. Obviously, a rotation of the nut 8 in this manner will cause an angular movement of the regulator arm 2 in one direction or the other according to the direction in which the nut is turned.

Figs. 3, 4 and 5 illustrate a modified form of actuating means for the regulator arm, consisting of a micrometer screw $6^a$ rotatably mounted in a transverse chamber in the base of the balance cock on a fixed bearing 7 and a spring bearing 7'. The screw is provided with a milled head $9^a$ that may be engaged by a screw driver or similar instrument through a slot 18 in the balance cock to turn said screw in either direction. The regulator arm $2^b$ is beveled at its free end to rest upon the screw between adjacent turns of the thread thereof so that by turning said screw through the head $9^a$ an angular movement of the regulator arm is effected.

In Figs. 6 and 7 I show a plain regulator arm $2^c$ on the under side of the balance cock which is engaged on one side by the inner end of a screw 19 threaded into one side of the balance cock, the opposite side of said regulator arm being pressed upon by a leaf spring 20. In this construction the turning of the screw in one direction effects the lateral movement of the regulator arm to one side, while the turning of the screw in the opposite direction permits the spring 20 to move the arm laterally to the opposite side.

It will be observed that all of the three forms of the invention illustrated employ an angularly movable regulator arm which is positioned wholly beneath the balance cock and actuating means also mounted beneath the upper surface of the balance cock to engage and effect angular adjustment of said regulator arm. The chief mechanical merits of this arrangement reside in the shortening of the curb pins with the consequent lessening of liability of bending or breaking the latter, the greater protection afforded to the regulator arm and its actuating mechanism by being located wholly beneath the balance cock, and the bringing of the balance cock up to the general level of the upper plate or bridges.

I claim:

1. In a regulator for watches, the combination with a balance cock formed with a depending bearing boss at one end, and a balance spring, of a regulator arm having a spring collar embracing said boss and carrying curb pins engaging said balance spring, said regulator arm being positioned wholly beneath and covered by said balance cock, and screw means located wholly below the upper surface of said balance cock adapted to engage the free end of said regulator arm and effect angular adjustment thereof, substantially as described.

2. In a regulator for watches, the combination with a balance cock formed with a transversely disposed chamber and a slot in its upper surface above and communicating with said chamber, of a balance spring, a regulator arm positioned wholly on the under side of said balance cock and covered thereby and carrying curb pins engaging said balance spring, a screw non-rotatably mounted in said chamber, and a nut on said screw engaging the free end of said regulator arm, said nut being accessible through said slot for turning the same on said screw, substantially as described.

3. In a regulator for watches, the combination with a balance cock formed with a transversely disposed chamber and a slot in the upper surface above and communicating with said chamber, of a balance spring, a regulator arm positioned wholly on the under side of said balance cock and covered thereby and carrying curb pins engaging said balance spring, said regulator arm having a spring fork at its free end, a screw non-rotatably mounted in said chamber, a nut on said screw having a radially enlarged portion embraced by the spring fork of said regulator arm and adapted to be engaged by an operating tool through said slot, substantially as described.

4. In a regulator for watches, the combination with a balance cock formed with a transversely disposed chamber and a slot in its upper surface above and communicating with said chamber, of a balance spring, a regulator arm mounted on and wholly beneath said balance cock and covered thereby and carrying curb pins engaging said balance spring, said regulator arm having a spring fork at its free end, a screw non-rotatably mounted in said chamber, a split nut elastically engaging said screw and having a radially enlarged portion embraced by the spring fork of said regulator arm and peripherally milled for engagement by an operating tool through said slot, substantially as described.

FREDERICK McINTYRE.

Witnesses:
   W. D. MOORE, Jr.,
   HENRIETTA STEWIG.